United States Patent
Pabba et al.

(10) Patent No.: US 12,532,544 B2
(45) Date of Patent: Jan. 20, 2026

(54) SPLIT N-WELL CELLS HAVING A MERGED N-WELL DESIGN

(71) Applicant: Synopsys, Inc., Mountain View, CA (US)

(72) Inventors: Venugopal Pabba, Ranga Reddy (IN); Biral Rasikbhai Patel, Ahmedabad (IN)

(73) Assignee: Synopsys, Inc., Sunnyvale, CA (US)

( * ) Notice: Subject to any disclaimer, the term of this patent is extended or adjusted under 35 U.S.C. 154(b) by 722 days.

(21) Appl. No.: 17/450,898

(22) Filed: Oct. 14, 2021

(65) Prior Publication Data

US 2022/0122961 A1 Apr. 21, 2022

Related U.S. Application Data

(60) Provisional application No. 63/092,859, filed on Oct. 16, 2020.

(51) Int. Cl.
*H10D 89/10* (2025.01)
*G06F 30/343* (2020.01)
*G06F 30/3953* (2020.01)
*H10D 84/01* (2025.01)
*H10D 84/03* (2025.01)

(52) U.S. Cl.
CPC ........... *H10D 89/10* (2025.01); *G06F 30/343* (2020.01); *G06F 30/3953* (2020.01); *H10D 84/0191* (2025.01); *H10D 84/038* (2025.01)

(58) Field of Classification Search
CPC ....... H01L 27/0925; H01L 2027/11874; H01L 27/0207; G06F 30/343; G06F 30/347; G06F 30/373; G06F 30/30–3953; H10D 89/10; H10D 84/80–998
See application file for complete search history.

(56) References Cited

U.S. PATENT DOCUMENTS

| | | | |
|---|---|---|---|
| 8,314,635 B2 * | 11/2012 | Law | G06F 30/343 326/38 |
| 8,487,658 B2 * | 7/2013 | Datta | H03K 19/018521 326/63 |
| 8,782,576 B1 * | 7/2014 | Bowers | G06F 30/39 716/139 |
| 9,405,879 B2 * | 8/2016 | Wang | G06F 30/392 |
| 2003/0005378 A1 * | 1/2003 | Tschanz | G01R 31/318575 714/726 |

(Continued)

*Primary Examiner* — Chad M Dicke
*Assistant Examiner* — Mario Andres Autore, Jr.
(74) *Attorney, Agent, or Firm* — Patterson + Sheridan, LLP

(57) ABSTRACT

An N-well cell stored as a digital representation with a non-transitory computer readable medium. The N-well cell is used within a circuit block of an integrated circuit device. The N-well cell includes a first N-well electrically connected to a first power rail providing a first supply voltage. The first N-well further includes a second N-well electrically connected to the first power rail, and a third N-well electrically connected to a second power rail providing a second supply voltage different from the first supply voltage. The third N-well is positioned between the first N-well and the second N-well. The third N-well includes a first logic sub-block electrically connected to the second power rail, and a second logic sub-block electrically connected to the second power rail.

18 Claims, 6 Drawing Sheets

(56) References Cited

U.S. PATENT DOCUMENTS

| | | | | |
|---|---|---|---|---|
| 2006/0114025 | A1* | 6/2006 | Frenkil | H10D 89/10 |
| | | | | 326/35 |
| 2007/0186205 | A1* | 8/2007 | Yu | G06F 30/327 |
| | | | | 716/108 |
| 2015/0109045 | A1* | 4/2015 | Vilangudipitchai | H03K 19/018528 |
| | | | | 327/333 |
| 2015/0262936 | A1* | 9/2015 | Bansal | H10D 89/10 |
| | | | | 257/499 |
| 2017/0352649 | A1* | 12/2017 | Pant | G06F 30/392 |
| 2018/0268096 | A1* | 9/2018 | Chuang | G06F 30/27 |
| 2018/0365363 | A1* | 12/2018 | Heilprin | H10D 89/10 |

* cited by examiner

SPLIT N-WELL CELLS HAVING A MERGED N-WELL DESIGN

RELATED APPLICATION

This application claims the benefit of U.S. provisional patent application Ser. No. 63/062,859, filed Oct. 16, 2021, which is hereby incorporated herein by reference.

TECHNICAL FIELD

The present disclosure relates to integrated circuit devices, and more particularly, to circuit design of the integrated circuit devices.

BACKGROUND

In the design of integrated circuit (IC) devices, cells from a standard library are used. In one example, the standard library includes N-type well (well) cells. The N-well cells may be merged N-well cells that provide a continuous N-well that is shared by the transistors of one or more cells. As merged N-well cells provide a continuous N-well that is shared by transistors of different cells, the merged N-well cell provides a circuit area savings as compared to other types of N-well cells. Further, the N-well cells may be split N-well cells. Split N-well cells support the use of multiple voltage levels within an IC device. For example, split N-well cells incorporate multiple different power supply routings to provide the different voltage levels.

SUMMARY

In one example, a non-transitory computer readable medium stores a digital representation of an N-well cell. The N-well cell comprises a first N-well configured to be electrically connected to a first power rail. The first power rail configured to provide a first supply voltage. The first N-well further comprises a second N-well configured to be electrically connected to the first power rail, and a third N-well configured to be electrically connected to a second power rail. The second power rail configured to provide a second supply voltage different from the first supply voltage. The third N-well is positioned between the first N-well and the second N-well. The third N-well comprises a first logic sub-block configured to be electrically connected to the second power rail, and a second logic sub-block configured to be electrically connected to the second power rail.

In one example, a circuit block comprises a first N-well cell configured to be electrically connected to a first power rail and a second power rail. The first power rail is configured to provide a first supply voltage, and the second power rail is configured to provide a second supply voltage different than the first supply voltage. The first N-well cell comprises a first N-well electrically connected to the first power rail, a second N-well configured electrically connected to the first power rail, and a third N-well electrically connected to the second power rail. The third N-well is positioned between the first N-well and the second N-well. The third N-well comprises a first logic sub-block configured to be electrically connected to the second power rail, and a second logic sub-block configured to be electrically connected to the second power rail.

In one example, an integrated circuit (IC) device comprises a first power rail configured to be electrically connected to a first supply voltage, and a second power rail configured to be electrically connected to a second supply voltage different than the first supply voltage. The IC device further comprises a circuit block electrically connected to the first power rail and the second power rail. The circuit block comprises a first N-well cell. The first N-well cell comprises a first N-well electrically connected to the first power rail, a second N-well configured electrically connected to the first power rail, and a third N-well electrically connected to the second power rail and positioned between the first N-well and the second N-well. The third N-well comprises a first logic sub-block electrically connected to the second power rail, and a second logic sub-block electrically connected to the second power rail.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a split N-well cells having merged N-well design.

An n-type well (N-well) circuit is made of an n-type substrate in which p-type devices (PMOS) are formed. In a merged N-well, all of the PMOS devices of the N-well are electrically connected to the same voltage. Further, a merged n-well is a continuous n-well that is shared by several transistors of one or more cells. Usage of a merged n-well in a circuit block reduces the circuit area of a corresponding integrated circuit (IC) device, thus reducing the cost of the IC device.

In a split N-well circuit, the PMOS devices that are positioned in the middle region of the N-well circuit are electrical connected to a first voltage, and the PMOS devices positioned at the outer left and right regions of the N-well circuit are electrically connected to a second voltage. Such N-well circuits may be referred to as multi-voltage level circuits. In one or more examples, the multi-voltage level circuits include always on (AON) buffers, AON inverts, isolation cells, level shifters, and retention registers, among others. Multi-voltage circuits handle multiple voltage levels, accordingly, one or more N-well cells within multi-voltage circuits include multiple routes for supplying multiple voltage levels. In low power designs, multi-voltages levels are supported through the usage of multi-voltage islands typically is increased as compared to higher power designs. In one or more examples, voltage islands utilize variable supply voltages such that when an IC device is in a high performance mode, the IC device is powered by a higher supply voltage than when the IC device is in a low performance mode. In some examples, the reduction in supply voltage generally results in reduced dynamic power. In one example, a voltage island may be switched off when it is in an inactive state (e.g., not in use) to eliminate the static leakage power.

Figure 1:
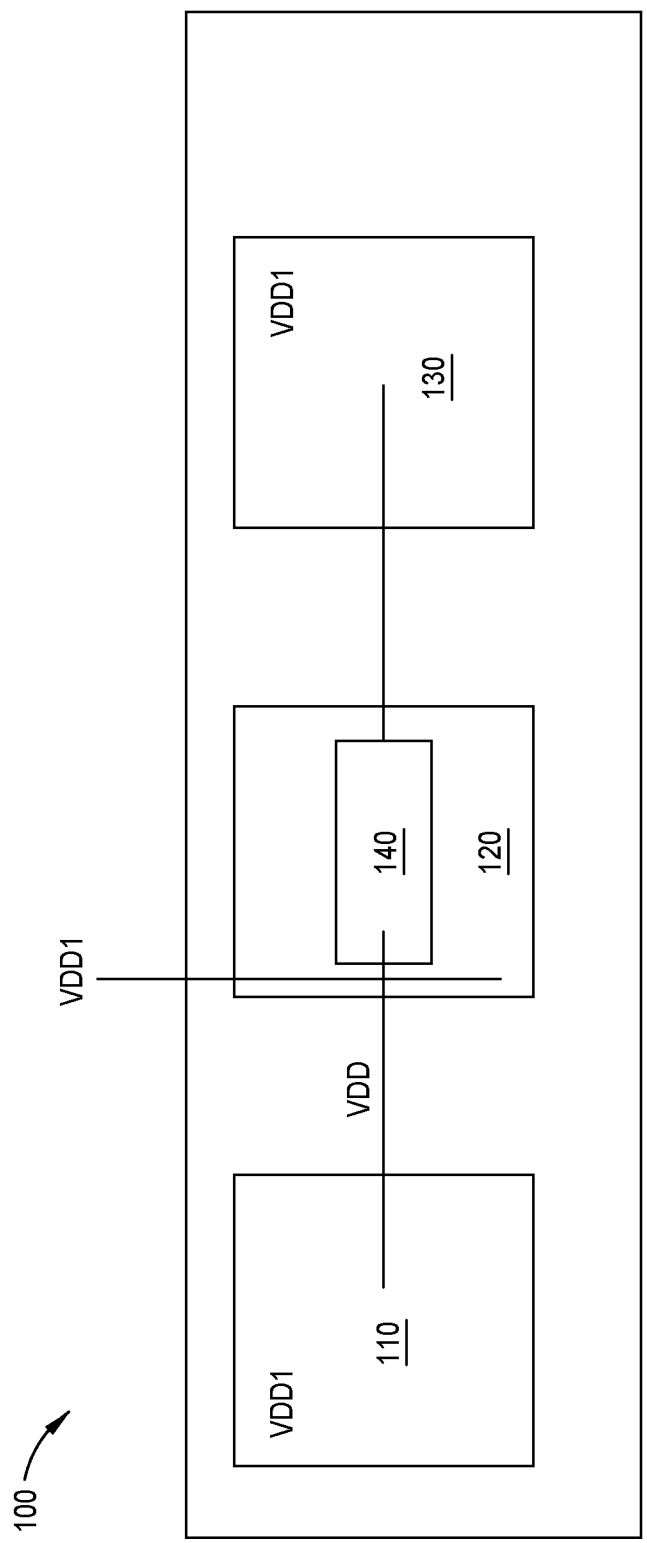
FIG. 1 illustrates block diagram of a split N-well cell, according to one or more examples.

In one or more examples, when designing an IC device, signals may cross different voltage islands at different voltage potentials. To maintain signal integrity, buffer cells are utilized. The buffer cells are electrically connected to the same supply voltages as source or destination voltage islands. FIG. 1 illustrates an exemplary IC device 100. The IC device 100 includes voltage islands 110, 120 and 130. The voltage islands 110 and 130 are electrically connected to a supply voltage VDD1 and the voltage island 120 is electrically connected to the supply voltage VDD. The supply voltage VDD is greater than or smaller than the supply voltage VDD1. Further, the voltage islands 110 and 130 are connected to each other through the voltage island 120. To ensure that voltage islands 110 and 130 are operated at the correct voltages, the voltage island 120 includes the buffer cell 140. The buffer cell 140 connects voltage islands 110 and 130. The buffer cell 140 is located within the voltage island 120, electrically connected to VDD1, and connects the voltage island 110 with the voltage island 130. The buffer cell 140 maintains the signal integrity of the power supply signal of the voltage island 120 as the voltage island 120 is connected to a supply voltage different than the voltage islands 110 and 130. In other examples, other cells (e.g., level shifters, AON cells, isolation cells, power switches, or retention flops, among others) may be utilized instead of, or in addition to, the buffer cell 140.

Figure 2:
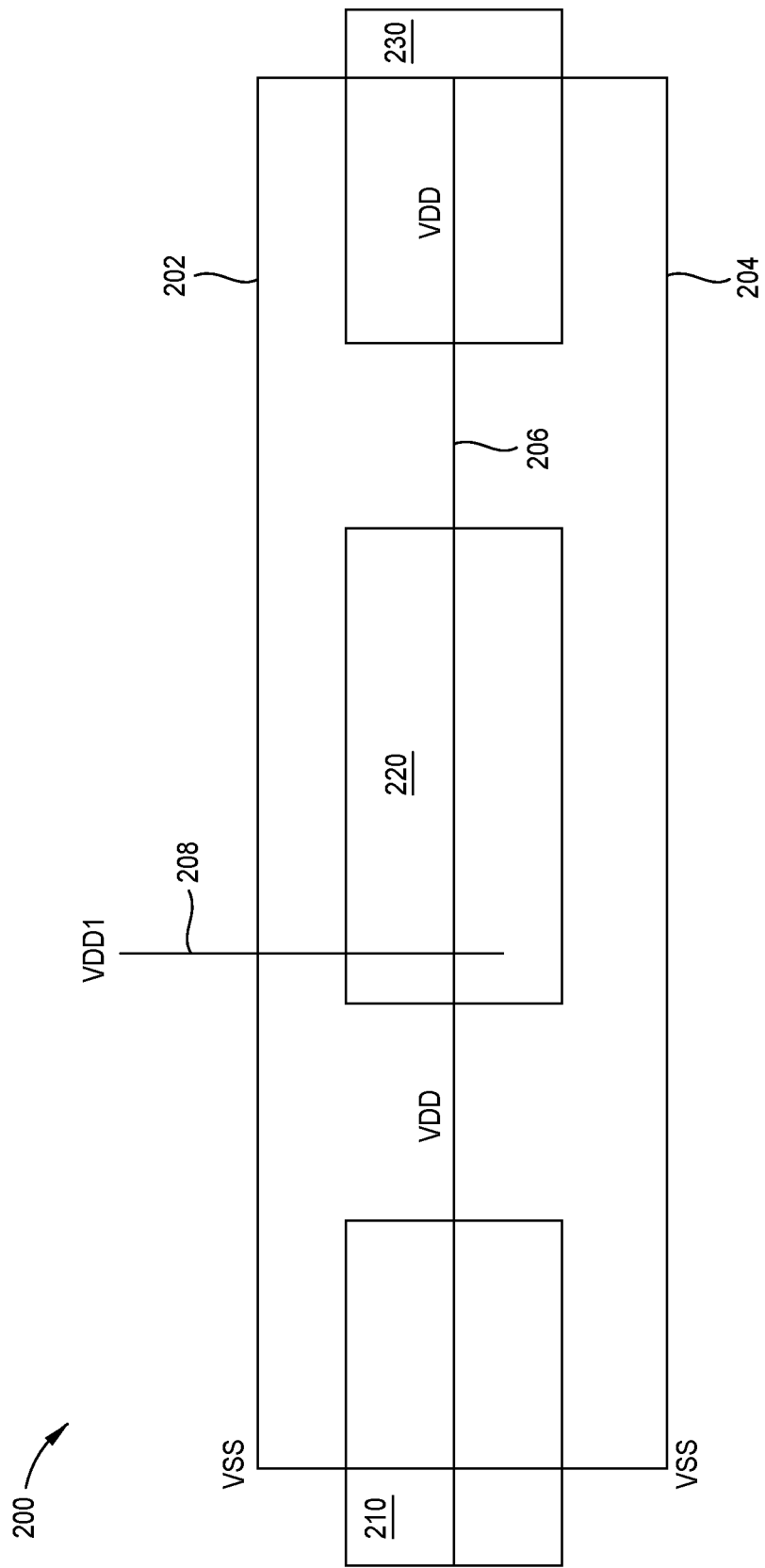
FIG. 2 illustrates block diagram of a split N-well cell, according to one or more examples.

FIG. 2 illustrates an N-well cell 200, according to one or more examples. The N-well cell 200 is a split N-well cell. The N-well cell 200 includes N-well 210, N-well 220, and N-well 230. The left and right N-wells 210, 230 of the N-well cell 200 are electrically connected to a supply voltage VDD, and the N-well 220 is electrically connected to a supply voltage VDD1. The N-wells 210, 220, and 230 are separated by a spacing. The spacing between each of the N-wells 210, 220, and 230 may be the same, or a first spacing between the N-wells 210, 220, and 230 may differ from another spacing between the N-wells 210, 220, and 230.

The split N-well cell 200 may be a single height double height N-well cell. In one or more examples, the N-Well cell 200 is an "N" times height N-well cell, where N is 2, 4, 6, 8, or more. For example, the height of the split N-well cell 200 may correspond to a height of logic elements within the corresponding logic library. In one example, a double height split N-well cell has a height that is double that of a single logic sub-block.

A power rail 202 and a power rail 204 extend horizontally across the N-well cell 200. The power rail 202 provides power to the top edge of the N-well cell 200 and the power rail 204 provides power to the bottom edge of the N-well cell 200. The power rails 202 and 204 provide the supply signal VSS. The power rails 202 and 204 extend horizontally across the N-well cell 200. A power rail includes each include one or more traces (wires) that is electrically connected to a voltage source. For example, the power rails 202 and 204 each includes one or more traces that are electrically connected to a voltage source that outputs the supply signal VSS.

The power rail 206 provides the supply signal VDD to the N-wells 210 and 230. The supply signal VDD has a voltage level that is higher than that of the voltage level of the supply signal VSS. The power rail 206 includes one or more traces that are electrically connected to a voltage source that outputs the supply signal VDD.

The power rail 208 provides the supply signal VDD1 to the N-well 220. The power supply signal VDD1 has a voltage level that is higher or lower than that of the supply signal VDD and higher than that of the supply signal VSS. The power rail 208 includes one or more traces that are electrically connected to a voltage source that outputs the supply signal VDD1.

In one example, N-wells 210 and 230 lack logic, and N-well 220 includes logic. As there is no logic in N-wells 210 and 230, area within the N-well cell 200 is wasted (unused). For example, almost two thirds of the available cell area does not include logic and is unused. Accordingly, the circuit area of the corresponding IC includes space that is unused and wasted, increasing the size of the corresponding IC. Wasted (or unused) cell area is area that lacks logic within the IC design.

Figure 3:
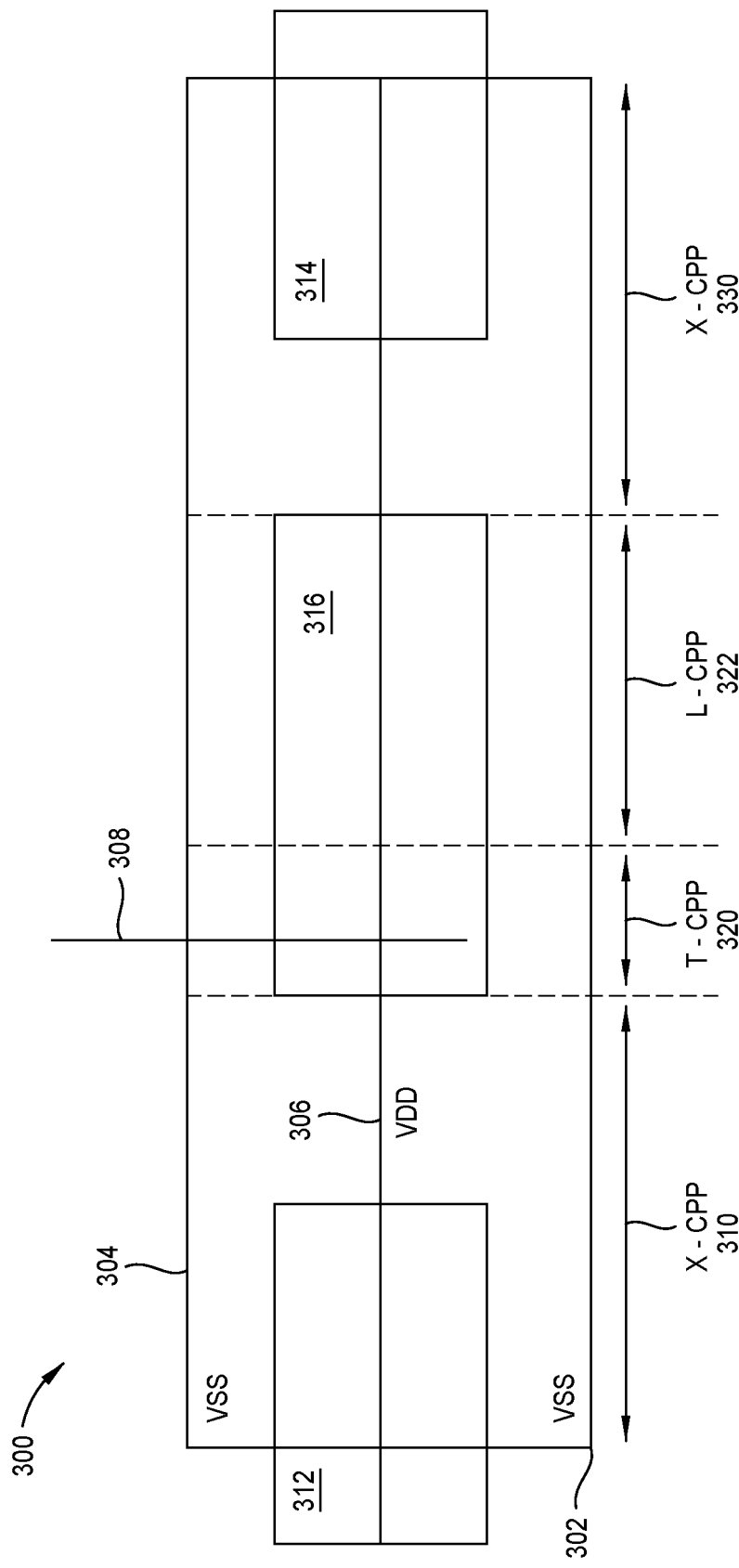
FIG. 3 illustrates block diagram of a split N-well cell, according to one or more examples.

As will be described in more detail in the following, by varying the position of sub-blocks within the N-wells of an N-well cell, wasted area within an IC design is reduced. FIG. 3 illustrates an N-well cell 300, according to one or more examples. The N-well cell 300 is a split N-well cell. The N-well cell 300 is configured similar to that of the N-well cell 200 of FIG. 2. For example, the N-well cell 300 includes left and right N-wells 312 and 314, respectively, and N-well 316 connected between the N-wells 312 and 314.

A power rail 302 and a power rail 304 extend horizontally across the N-well cell 300. The power rail 302 provides power to the top edge of the N-well cell 300 and the power rail 304 provides power to the bottom edge of the N-well cell 300. The power rails 302 and 304 provide the supply signal VSS. The power rails 302 and 304 extend horizontally across the N-well cell 300.

The power rail 306 provides the supply signal VDD to the N-wells 312 and 314. The supply signal VDD has a voltage level that is higher than that of the voltage level of the supply signal VSS.

The power rail 308 provides the supply signal VDD1 to the N-well 316. The power supply signal VDD1 has a voltage level that is higher or lower than that of the supply signal VDD and higher than that of the supply signal VSS.

The N-well cell 300 is split into four sub-blocks, e.g., left sub-block (X-CPP) 310, right sub-block (X-CPP) 330, a well tap (TAP) sub-block (T-CPP) 320, and logic sub-block (L-CPP) 322. The sub-blocks 310 and 330 each have a width of X-CPP. The N-wells 312 and 314 are associated with left sub-block 310 and right sub-block 330, respectively. The N-well 316 is associated with the TAP sub-block 320 and the logic sub-block 322. As is noted above with regard to the N-wells 210 and 230, the N-wells 312 and 314, and corresponding sub-blocks 310 and 330, do not include logic and are associated with wasted (e.g., unused) space. The TAP sub-block 320 is electrically connected to the supply voltage VDD1 via the power rail 308. The power rail may be referred to as a TAP (e.g., electrical connection). The width of the TAP sub-block is T-CPP. The logic sub-block 322 has a width L-CPP. The TAP sub-block 320 may be connected to either side of the logic sub-block 322. The TAP sub-block 320 electrically connected to the logic sub-block 322 and electrically connects the logic sub-block 322 to the power rail 308 and the supply voltage VDD1. For a given cell library, the widths X-CPP & T-CPP are the same in each of the split N-well cells. The width L-CPP may vary from one cell to another cell depending on the corresponding logic that makes up the logic sub-block.

Figure 4:
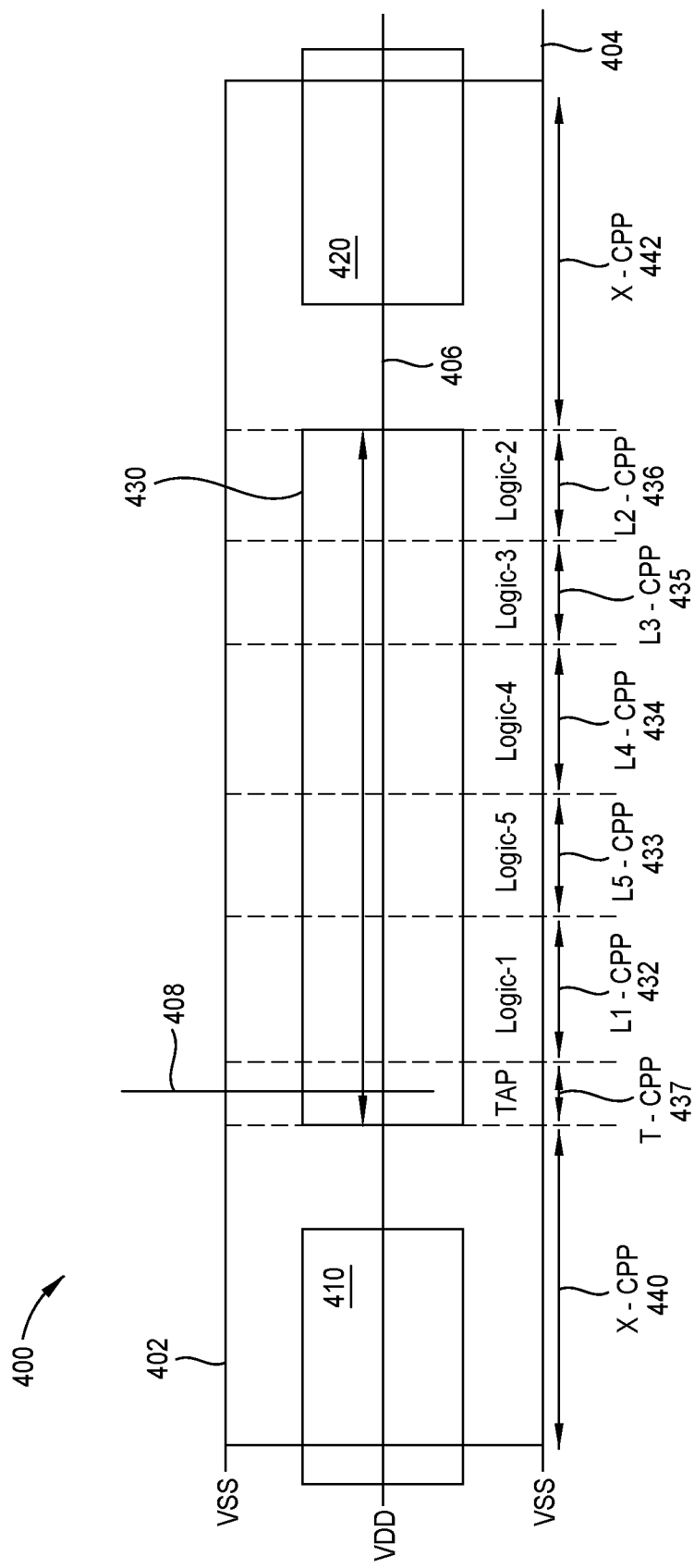
FIG. 4 illustrates block diagram of a merged split N-well cell, according to one or more examples.

FIG. 4 illustrates N-well cell 400, according to one or more examples. The N-well cell 400 includes N-wells 410, 420, and 430. The N-well 410 corresponds to the sub-block (X-CPP) 440, the N-well 420 corresponds to the right sub-block (X-CPP) 442, and the N-well 430 corresponds to the TAP sub-block 437, and the logic sub-blocks 432-436.

The N-well cell 400 is configured similar to the N-well cell 300. For example, a power rail 402 and a power rail 404 extend horizontally across the N-well cell 400. The power rail 402 provides power to the top edge of the N-well cell 400 and the power rail 404 provides power to the bottom edge of the N-well cell 400. The power rails 402 and 404 provide the supply signal VSS. The power rails 402 and 404 extend horizontally across the N-well cell 400. A power rail 406 provides the supply signal VDD to the N-wells 410 and 420. The supply signal VDD has a voltage level that is higher than that of the voltage level of the supply signal VSS.

The power rail 408 provides the supply signal VDD1 to the N-well 430. The power supply signal VDD1 has a voltage level that is higher or lower than that of the supply signal VDD and higher than that of the supply signal VSS.

The N-well cell 400 may be referred to as a split N-well cell as the N-wells 410 and 420 are positioned such that there is a spacing between the N-wells 410 and 430 and 420 and 430. The spacing between the N-wells may be the same or different, such that one spacing is larger than the other.

Further, the N-well cell 400 may be referred to as a merged split N-well cell as the N-well 430 is a merged N-well that includes multiple logic sub-blocks. In one or more examples, the N-well 430 includes "N" logic sub-blocks. N is an integer greater than or equal to two. As compared to split N-well cells, as merged split N-well cell 400 uses less circuit area as multiple logic sub-blocks are included within an N-well of the N-well cell 400. Further, the merged split N-well cell 400 supports the use of multiple supply voltages. Contrary, split N-well cells that do not include a merged N-well cell with multiple logic sub-blocks use more circuit area as the logic sub-blocks are spread out over multiple N-well cells. For example, for two logic sub-blocks, two N-well cells are used. A first logic sub-block is associated with a first N-well cell and a second logic sub-block is associated with a second N-well cell. In such an example, the circuit area associated with at least one N-well cell is saved by using a merged split N-well cell.

As illustrated in FIG. 4, the N-well 430 includes logic sub-blocks 432, 433, 434, 435, and 436. The N-well 430 further includes TAP sub-block 437. Each of the logic sub-blocks 432, 433, 434, 435, and 436 are different logic sub-blocks. The logic sub-blocks may be buffers, AND gates, OR gates, invertors, and power gates, among others. In other examples, one or more of the logic sub-blocks 432-436 may be the same as another logic sub-block. In other examples, other numbers of and/or configurations of the logic sub-blocks may be implemented within the N-well 430. The sub-blocks 432-437 may be selected based on the design requirements of the corresponding IC device. In one example, the logic sub-block 432 includes Logic-1, the logic sub-block 433 includes Logic-5, the logic sub-block 434 includes Logic-4, the logic sub-block 435 includes Logic-3, and the logic sub-block 436 includes Logic-2. The logic sub-blocks 432-436 are connected to each other. For example, the logic sub-blocks 432-436 are connected to each other in series.

The N-well 430 includes TAP sub-block 437. The TAP sub-block 437 is positioned adjacent to logic sub-block 432. In other examples, the TAP sub-block 437 is positioned adjacent to the logic sub-block 436. Further, in one or more examples, the N-well 430 includes multiple TAP sub-blocks. In such an example, a first TAP sub-block is positioned adjacent to the logic sub-block 432 and a second TAP sub-block is positioned adjacent to the logic sub-block 436. Additionally, or alternatively, one or more TAP sub-blocks may be positioned between logic sub-blocks 432-436.

The logic sub-blocks 432-436 are electrically connected to TAP sub-block 437. The TAP sub-block 437 is electrically connected to the power rail 408 and the supply voltage VDD1. The TAP sub-block 437 electrically connects the logic sub-blocks 432-436 to the power rail 408 and the supply voltage VDD1.

In one or more examples, a buffer, or other signal integrity circuit, electrically couples the supply voltage between the logic sub-blocks 432-436. For example, one or more of the logic sub-blocks 432-436 includes a buffer, or other signal integrity circuit, to connect the supply voltage VDD1 provided by the TAP sub-block 437 (or another TAP sub-block) between the logic sub-blocks 432-436.

In examples where the N-well 430 includes a single TAP sub-block (e.g., the TAP sub-block 430), or multiple TAP sub-blocks that are connected to the same supply voltage, each of the logic sub-blocks 432-436 are connected to the same supply voltage VDD1.

Figure 6:
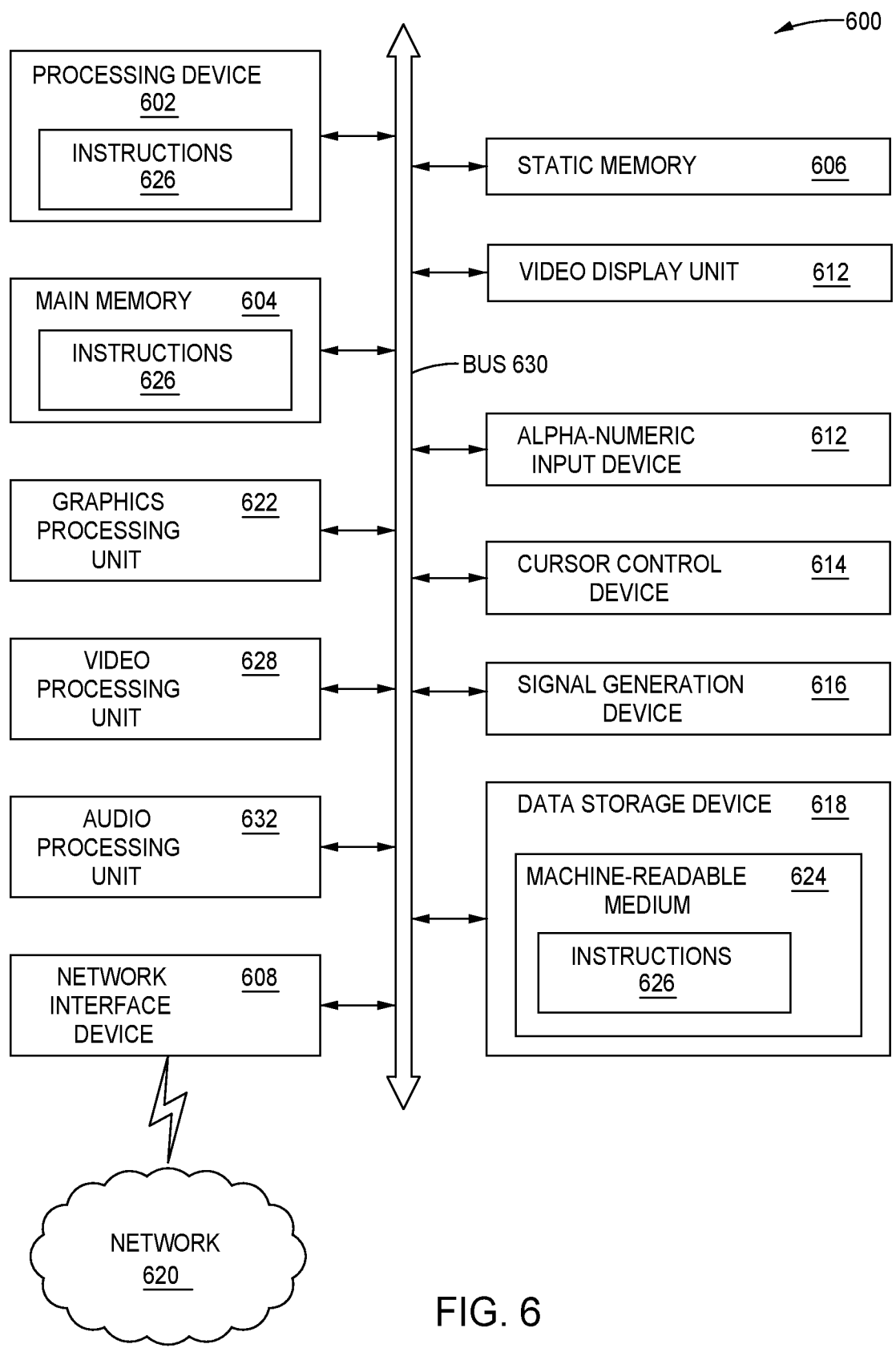
FIG. 6 depicts a diagram of an example computer system in which embodiments of the present disclosure may operate.

In one or more examples, the order of the logic sub-blocks 432-436 differs from that illustrated in FIG. 6. The order of the sub-blocks may be selected based on the power-performance-area (PPA) metric. For example, the order of the logic sub-blocks providing the best PPA may be selected. Alternatively, the sub-block order providing a PPA above a threshold value may be chosen. In one or more examples, the sub-block placement is chosen to use the minimum routing resources. For example, an output of the logic sub-block 432 is connected to the input of the logic sub-block 436, accordingly, during placement, to improve the PPA, the logic sub-blocks 432 and 434 are placed adjacent to each other.

The merged split N-well cell 400 utilizes design area (e.g., circuit area) more efficiently than split N-well cells or merged N-well cells. For example, the merged split N-well cell 400 uses less area than a split NW cell design and a merged NW cell design having the same logic sub-blocks. The circuit area savings may be utilized for additional logic implementations.

As is noted above, in an IC device that incorporates split N-well cells, each logic sub-block is incorporated within a different N-well cell. Accordingly, for M logic sub-blocks (M being two or more) a merged split N-well cell (e.g., the merged split N-well cell 400) has a width that is less than the combined total width of the split N-well cells.

In the example of FIG. 4, the merged split N-well cell 400 incorporates five logic sub-blocks within the N-well 430. If split N-well cells were used instead of the merged split N-well cell 400, five different split N-well cells are needed; one split N-well cell for each logic sub-block.

Figure 5:
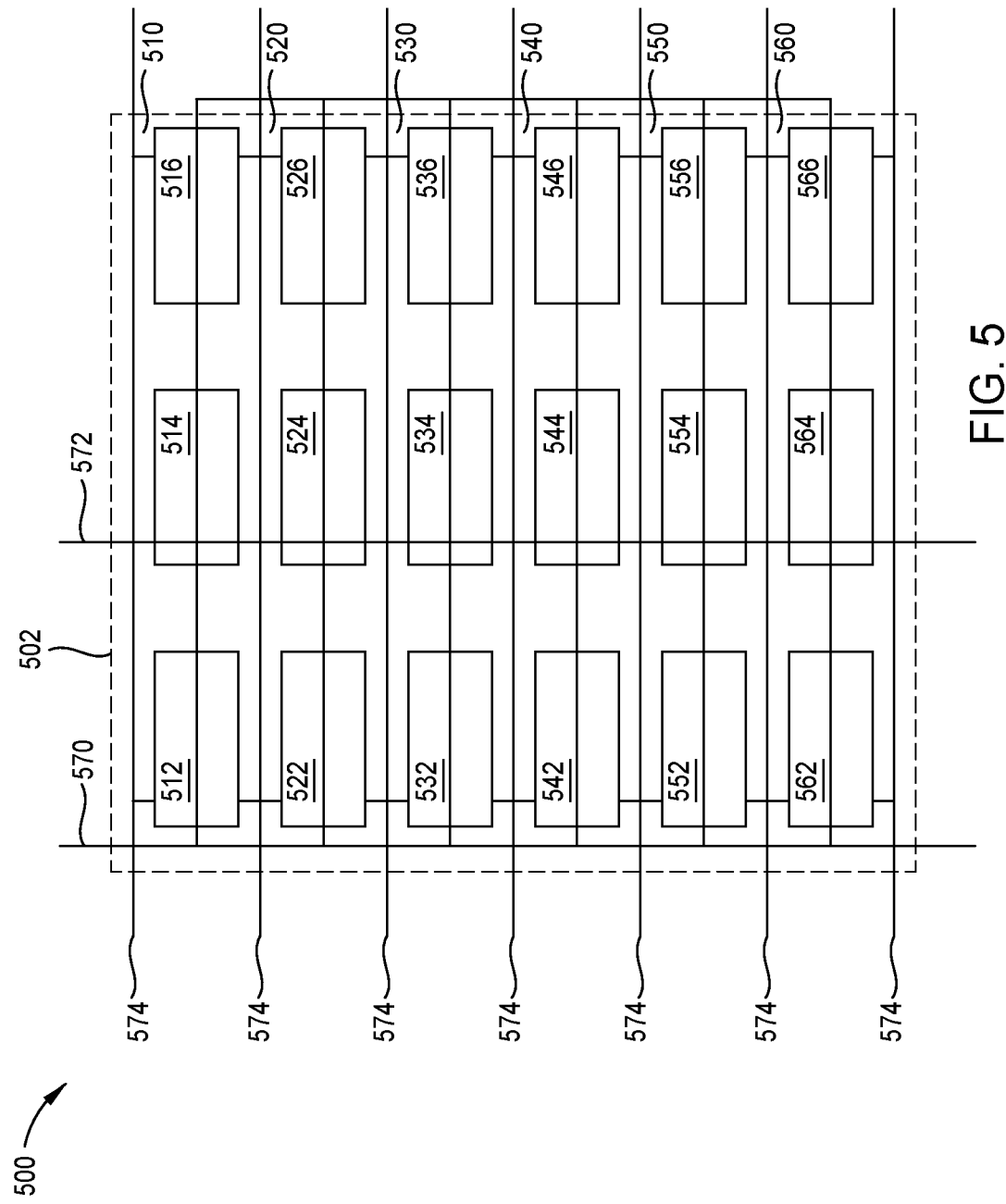
FIG. 5 illustrates block diagram an integrated circuit device comprising one or more merged split N-well cells, according to one or more examples.

The width of the merged split N-well cell 400 corresponds to the width of the sub-blocks of the merged split N-well cell 400. For example, the width of the merged split N-well cell is the combined width of sub-blocks 432-437, 440 and 442. The width of sub-blocks 432-437 is represented as "L1CPP"-"L5CPP", respectively. CPP is a Critical Poly-Pitch. The width of the TAP sub-block 437 is represented as "TCPP", and the width of the sub-blocks 440 and 442 is "XCPP". Accordingly, the width of the N-well cell 400 may be determined based on [2X+T+(L1+L2+L3+L4+L5)]CPP. The combined width of the five split N-well cells that incorporate the five sub-blocks 432-437 is [10X+5T+(L1+L2+L3+L4+L5)]CPP, as each of the five split N-well cells includes two sub-blocks similar to sub-blocks 440 and 442 and a TAP sub-block similar to the TAP sub-block 437. Accordingly, the width of the merged split N-well cell 400 is less than the combined width of the five different split N-well cells. In one example, when "n" split N-well cells having different logic sub-blocks are utilized, the width is [2n*X+n*T+(L1+L2+L3++Ln)]CPP. However, in examples that employ merged split N-well cells having multiple logic sub-blocks as illustrated in FIG. 5, the width of "n" merged split N-well cells is [2*X +T+(L1+L2+L3++Ln)]CPP. The width gained by employing merged split N-well cells having multiple logic sub-blocks is [2(n−1)*X+(n−1)*T] CPP (i.e., [(n−1)*(2X+T)*CPP] and area gain by [(n−1)*(2X+T)*CPP]*[2*Height]).

Further, as compared to using multiple split NW cells to implement the logic sub-blocks 432-436, the merged split N-well cell 400 utilizes less TAP sub-blocks. For example, the merged split N-well cell 400 utilizes a single TAP sub-block to implement the five logic sub-blocks 432-436, while five TAP sub-blocks would be needed to implement the five sub-blocks in different split N-well cells. Accordingly, routing resources are reduced as the power rail supplying the supply voltage VDD1 of the merged split N-well cell 400 is connected at common node instead of distributed manner when employing multiple split N-well cells.

In one or more examples, placing multiple logic sub-blocks in a common area within the merged split N-well cell 400 saves routing resources as the corresponding power supply is connected to the multiple logic sub-blocks at a common node (e.g., TAP sub-block 437) as compare to other split N-well cells that utilize a distributed manner for connecting logic sub-blocks of different split NW cells together. In one or more examples, including multiple logic sub-blocks within the merged split N-well cell 400 provides a continuous diffusion which increases a length of diffusion (LOD) to gate, increasing the performance of the device and also reduces the well proximity effect on devices. In one example, in split N-well cells, the logic sub blocks are separated and there is a diffusion break. In merged split N-well cells, the logic sub-blocks are placed together and the diffusion is continuous.

In one or more examples, an IC device that incorporates a merged split N-well cell such as the merged split N-well cell 400 includes a greater number of logic devices than an IC incorporating other split N-well cell designs. For example, in many instances, each split N-well cells is required to maintain a minimum width per the IC device manufacturing requirements. Increasing the width of the split N-well cell to meet the minimum width requirements may result in additional wasted (e.g., unused) space, as the width that is added to the N-well cell to meet the minimum width requirements is empty space and lacks logic. However, by incorporating multiple logic sub-blocks within a merged split N-well cell, more area within the merged split N-well cell corresponds to logic sub-blocks, decreasing the wasted (e.g., unused) space within the merged split N-well cell.

In one or more examples, the N-well cell 400 is part of a cell library stored within a memory (e.g., the memory 604 and/or 624 of FIG. 6). In such examples, the N-well cell 400 is stored within the memory (e.g., the memory 604 and/or 624 of FIG. 6). A logic library may additionally be stored within the memory (e.g., the memory 604 and/or 624 of FIG. 6). In one or more examples, the cell library and logic library may be part of a common library stored within a memory (e.g., the memory 604 and/or 624 of FIG. 6). The N-well cell 400 may be accessed by a processing device (e.g., the memory 604 and/or 624 of FIG. 6) executing instructions (e.g., the instructions 626) stored within a memory (e.g., the memory 604 and/or 624 of FIG. 6) to generate an IC device.

FIG. 5 illustrates a portion of an IC device 500, accordingly to one or more examples. The IC device 500 includes circuit block 502. In one example, the IC device 500 includes multiple circuit blocks 502. For example, one or more circuit blocks may be positioned on the left or right side of the circuit block 502.

The circuit block 502 includes multiple merged split N-well cells 510-560. The merged split N-well cells 510-560 are connected to the power rails 570, 572 and 574 and corresponding supply voltages VDD, VDD1, and VSS. As is noted above, the supply voltages VDD, VDD1, and VSS differ from each other.

Each of the merged split N-well cells 510-560 are configured similar to the merged split N-well cell 400 of FIG. 4. For example, the merged split N-well cell 510 includes N-wells 512 and 516 spaced apart from the N-well 514. The N-wells 512 and 516 are connected to the power rail 570 and the supply voltage VDD. The N-well 514 is connected to the power rail 572 and the supply voltage VDD1.

The merged split N-well cell 520 includes N-wells 522 and 526 that are spaced apart from the N-well 524. The N-wells 522 and 526 are connected to the power rail 570 and the supply voltage VDD. The N-well 524 is connected to the power rail 572 and the supply voltage VDD1. The merged split N-well cell 530 includes N-wells 532 and 536 that are spaced apart from the N-well 534. The N-wells 532 and 536 are connected to the power rail 570 and the supply voltage VDD. The N-well 534 is connected to the power rail 572 and the supply voltage VDD1. The merged split N-well cell 540 includes N-wells 542 and 546 that are spaced apart from the N-well 544. The N-wells 542 and 546 are connected to the power rail 570 and the supply voltage VDD. The N-well 544 is connected to the power rail 572 and the supply voltage VDD1. The merged split N-well cell 550 includes N-wells 552 and 556 that are spaced apart from the N-well 554. The N-wells 552 and 556 are connected to the power rail 570 and the supply voltage VDD. The N-well 554 is connected to the power rail 572 and the supply voltage VDD1. The merged split N-well cell 560 includes N-wells 562 and 566 spaced apart from the N-well 564. The N-wells 562 and 566 are connected to the power rail 570 and the supply voltage VDD. The N-well 564 is connected to the power rail 572 and the supply voltage VDD.

While the circuit block 502 is illustrated as including six merged split N-well cells, in other examples, the circuit block 502 may include more than or less than size merged split N-well cells. Further, as is noted above, each of the merged split N-well cells 510-560 is configured similar to the merged split N-well cell 400 of FIG. 4. For example, each of the each of the merged split N-well cells 510-560 includes multiple logic sub-blocks and one or more TAP sub-blocks. The TAP sub-blocks are connected to the power rail 572 to supply the supply voltage VDD1 to the corresponding logic sub-blocks. Two or more the merged split N-well cells 510-560 may include one or more of the same number, type, and configuration of logic sub-blocks. The configuration of logic sub-blocks corresponds to the order in which the logic sub-blocks are positioned within the N-well of the merged split N-well cells. For example, the merged split N-well cells 510 and 520 include one or more of the same number, type, and configuration of logic sub-blocks. In other examples, each of the merged split N-well cells 510-560 include one or more of the same number, type, and configuration of logic sub-blocks. In other examples, each of the merged split N-well cells 510-560 differ in at least one of a number, type, and configuration of logic sub-blocks.

Further, the merged split N-well cells 510-560 may include the same or different number of TAP sub-blocks and/or configuration of TAP sub-blocks.

In an example where the IC device 500 includes multiple circuit blocks 502, the merged split N-well cells of the different circuit blocks 502 may be similar to each other, such that or more of the merged split N-well cells of the different circuit blocks include one or more of the same number, type, and configuration of logic sub-blocks. In other examples, each of the merged split N-well cells of the different circuit blocks 502 differ in at least one a number, type, and configuration of logic sub-blocks.

In one example, the IC device 500 is a metal-oxide-semiconductor (MOS) device. In other examples, the IC device 500 is other types of devices.

As is described above, merged split N-well cells include an N-well that incorporates multiple logic sub-blocks. Accordingly, the unused circuit area of a corresponding IC device (e.g., the IC device 500) is reduced, as the merged split N-well cells have less wasted (e.g., unused) area as compared to other types of N-well cells. Further, as a merged split N-well cell incorporates multiple logic sub-blocks within a N-well of the merged split N-well cell, reduces routing resources as compared to other types of N-well cells as routing of the voltage supply of the logic sub-blocks is connected at common node instead of distributed manner when employing multiple other types of N-well cells. Reducing the amount of wasted area and routing resources, decreases the size of the corresponding IC device, thus decreasing the manufacturing costs of the IC device.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A non-transitory computer readable medium storing a digital representation of an N-well cell, the N-well cell comprising:
    a first N-well configured to be electrically connected to a first power rail, the first power rail configured to provide a first supply voltage;
    a second N-well configured to be electrically connected to the first power rail; and
    a third N-well configured to be electrically connected to a second power rail, the second power rail configured to provide a second supply voltage different from the first supply voltage, wherein third N-well is positioned between the first N-well and the second N-well, and comprises:
        a first logic sub-block configured to be electrically connected to the second power rail;
        a second logic sub-block configured to be electrically connected to the second power rail; and
        a third logic sub-block configured to be electrically connected to the second power rail, wherein each of the first logic sub-block, the second logic sub-block and the third logic sub-block corresponds to a different type of logic element, and wherein a placement of the first logic sub-block relative to the second logic sub-block and the third logic sub-block within the third N-well corresponds to at least one of a power-performance-area metric and routing resource of the first logic sub-block, the second logic sub-block, and the third logic sub-block, and wherein a diffusion associated with the first logic sub-block, and the second logic sub-block, and the third logic sub-block within the third N-well is continuous.

2. The non-transitory computer readable medium of claim 1, wherein the third N-well further comprises a well tap sub-block configured to electrically connect the first logic sub-block and the second logic sub-block to the second power rail.

3. The non-transitory computer readable medium of claim 2, wherein the well tap sub-block is adjacent to the first logic sub-block.

4. The non-transitory computer readable medium of claim 3, wherein the second logic sub-block is configured to be electrically connected to the second power rail via the first logic sub-block and the well tap sub-block.

5. The non-transitory computer readable medium of claim 1, wherein the third logic sub is disposed adjacent to the second logic sub-block.

6. A circuit block comprising:
    a first N-well cell configured to be electrically connected to a first power rail and a second power rail, wherein the first power rail is configured to provide a first supply voltage, and the second power rail is configured to provide a second supply voltage different than the first supply voltage, the first N-well cell comprising:
        a first N-well electrically connected to the first power rail;
        a second N-well configured electrically connected to the first power rail; and
        a third N-well electrically connected to the second power rail, third N-well positioned between the first N-well and the second N-well, wherein the third N-well comprises:
            a first logic sub-block configured to be electrically connected to the second power rail;
            a second logic sub-block configured to be electrically connected to the second power rail:
            a third logic sub-block configured to be electrically connected to the second power rail, wherein each of the first logic sub-block, the second logic sub-block, and the third logic sub-block corresponds to a different type of logic element, and wherein a placement of the first logic sub-block relative to the second logic sub-block, and the third logic sub-block within the third N-well corresponds to at least one of a power-performance-area metric and routing resource of the first logic sub-block, the second logic sub-block, and the third logic sub-block, and wherein a diffusion associated with the first logic sub-block, the second logic sub-block, and the third logic sub-block within the third N-well is continuous.

7. The circuit block of claim 6, wherein the third N-well further comprises a well tap sub-block configured to be electrically connected to the second power rail and configured to electrically connect the first logic sub-block and the second logic sub-block to the second power rail.

8. The circuit block of claim 7, wherein the well tap sub-block is adjacent to the first logic sub-block.

9. The circuit block of claim 8, wherein the second logic sub-block is electrically connected to the first logic sub-block and the well tap sub-block.

10. The circuit block of claim 6, wherein the third logic sub-block is disposed adjacent to the second logic sub-block.

11. The circuit block of claim 6 further comprising a second N-well cell comprising:
 a fourth N-well electrically connected to the first power rail;
 a fifth N-well configured electrically connected to the first power rail; and
 a sixth N-well electrically connected to the second power rail, the sixth N-well positioned between the fourth N-well and the fifth N-well, wherein the sixth N-well comprises:
  a fifth logic sub-block configured to be electrically connected to the second power rail; and
  a fourth logic sub-block configured to be electrically connected to the second power rail.

12. An integrated circuit (IC) device comprising:
 a first power rail configured to be electrically connected to a first supply voltage;
 a second power rail configured to be electrically connected to a second supply voltage different than the first supply voltage; and
 a circuit block electrically connected to the first power rail and the second power rail, the circuit block comprising:
  a first N-well cell comprising:
   a first N-well electrically connected to the first power rail;
   a second N-well configured electrically connected to the first power rail; and
   a third N-well electrically connected to the second power rail and positioned between the first N-well and the second N-well, wherein the third N-well comprises:
    a first logic sub-block electrically connected to the second power rail;
    a second logic sub-block electrically connected to the second power rail, and
    a third logic sub-block electrically connected to the second power rail, wherein each of the first logic sub-block the second logic sub-block, and the third logic sub-block corresponds to a different type of logic element, and wherein a placement of the first logic sub-block relative to the second logic sub-block and the third logic sub-block within the third N-well corresponds to at least one of a power-performance-area metric and routing resource of the first logic sub-block, the second logic sub-block, and the third logic sub-block, and wherein a diffusion associated with the first logic sub-block, the second logic sub-block, and the third logic sub-block within the third N-well is continuous.

13. The IC device of claim 12, wherein the third N-well further comprises a well tap sub-block electrically connected to the second power rail and the first logic sub-block and the second logic sub-block.

14. The IC device of claim 13, wherein the well tap sub-block is adjacent to the first logic sub-block.

15. The IC device of claim 14, wherein the third logic sub-block is disposed adjacent to the second logic sub-block.

16. The IC device of claim 12, wherein the circuit block further comprises a second N-well cell comprising:
 a fourth N-well electrically connected to the first power rail;
 a fifth N-well configured electrically connected to the first power rail; and
 a sixth N-well electrically connected to the second power rail, the sixth N-well positioned between the fourth N-well and the fifth N-well, wherein the sixth N-well comprises:
  a fifth logic sub-block configured to be electrically connected to the second power rail; and
  a fourth logic sub-block configured to be electrically connected to the second power rail.

17. The circuit block of claim 6, wherein the placement of the first logic sub-block relative to the second logic sub-block, and the third logic sub-block is an order of the first logic sub-block, the second logic sub-block, and the third logic sub-block within the third N-well that is based on a power-performance-area metric.

18. The circuit block of claim 6, wherein the placement of the first logic sub-block, the second logic sub-block, and the third logic sub-block within the third N-well is based on the power-performance-area metric and the routing resources of the first logic sub-block, the second logic sub-block, and the third logic sub-block.

* * * * *